Jan. 30, 1962 W. J. HEACOCK, JR 3,019,392

STORAGE TIMER GATING DEVICE

Filed Sept. 30, 1959

INVENTOR.
William J. Heacock, Jr.
BY
Max A. Farmer
ATTORNEYS.

United States Patent Office 3,019,392

Patented Jan. 30, 1962

3,019,392

STORAGE TIMER GATING DEVICE

William J. Heacock, Jr., Levittown, N.Y., assignor, by mesne assignments, to the United States of America as represented by the Secretary of the Navy Filed Sept. 30, 1959, Ser. No. 843,605
6 Claims. (Cl. 328—119)

This invention relates to a gating circuit for an equipment where the gating circuit is responsive to pulse patterns in an incoming pulse train and more particularly to a gating circuit that has two substantially stable gating conditions and is switched from one gating condition to its other gating condition upon the occurrence of one particular pulse pattern and is switched back to the former gating condition upon the occurrence of another particular pulse pattern.

An object of this invention is to selectively gate on or gate off an equipment by means of a coded pulse signal.

A further object is to provide a gating circuit that has two stable gating conditions and is operable by a continuing pulse signal coded for switching at selected times from one gating condition to the other gating condition and back again.

A further object is to provide a gating circuit that is operable from one substantially stable gating condition to another substantially stable gating condition and back again by patterns of occurrence and non-occurrence of pulses respectively in a continuing pulse train.

Other objects and many of the attendant advantages of this invention will be readily appreciated as the same becomes better understood by reference to the following detailed description when considered in connection with the accompanying drawing wherein.

Figure 1:
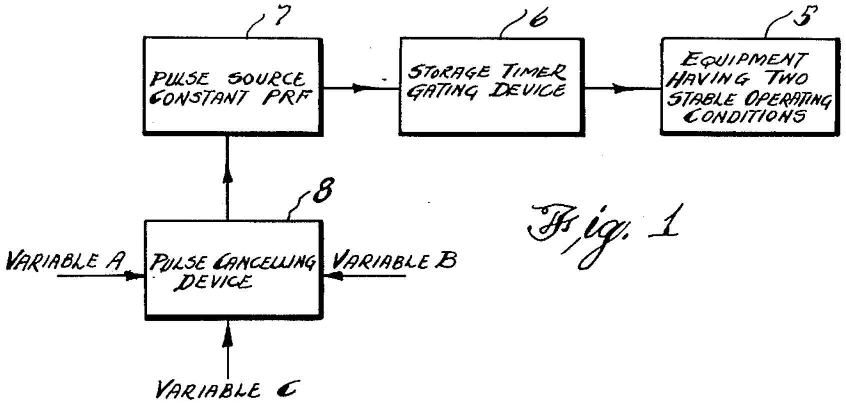
FIG. 1 is a block diagram of one type of system that may advantageously utilize this invention.
Figure 2:
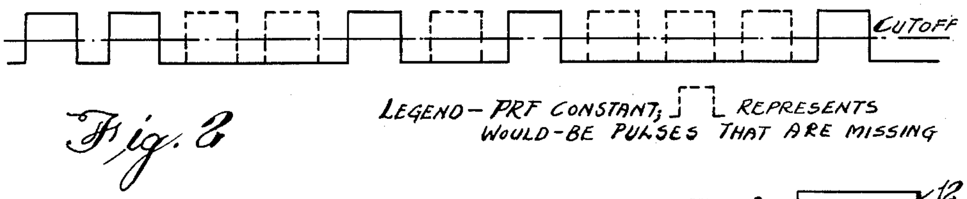
FIG. 2 illustrates the pulse train output provided by the pulse source of FIG. 1.

In the system illustrated in FIG. 1, an equipment 5 having two substantially stable operating conditions (e.g., on and off) is controlled by a storage timer gating device 6 for switching the equipment from one operating condition to the other, and a pulse source 7 for providing pulses of constant pulse repetition frequency and a pulse canceling device 8 for cancelling pulses from the train generated by source 7. The equipment 5 may be a receiver coupled to a recorder. The device 8 may be a receiver responsive to coding pulses from a transmitting equipment that is also sending information to the receiver-recorder or may be a coincidence circuit responsive to two or more variables, such as time, bearing, operation or non operation of other equipment, etc.; it provides disabling or canceling pulses to pulse source 7 to cancel at intervals one would-be pulse or a plurality of consecutive would-be pulses from the pulse train provided by pulse source 7.

In its broader aspects this invention concerns a storage timer gating device 6 which includes an electrical means with an output terminal for providing either of two substantially stable voltages, that differ considerably, one auxiliary circuit responsive to one predetermined pattern of input pulses and operable on the electrical means when the latter is providing a particular one of its two substantially stable voltages, to switch the means so that it provides the other of its two substantially stable voltages, and another auxiliary circuit responsive to another predetermined pattern of input pulses to switch the means back so that it again provides the first mentioned one of its two substantially stable voltages.

Figure 3:
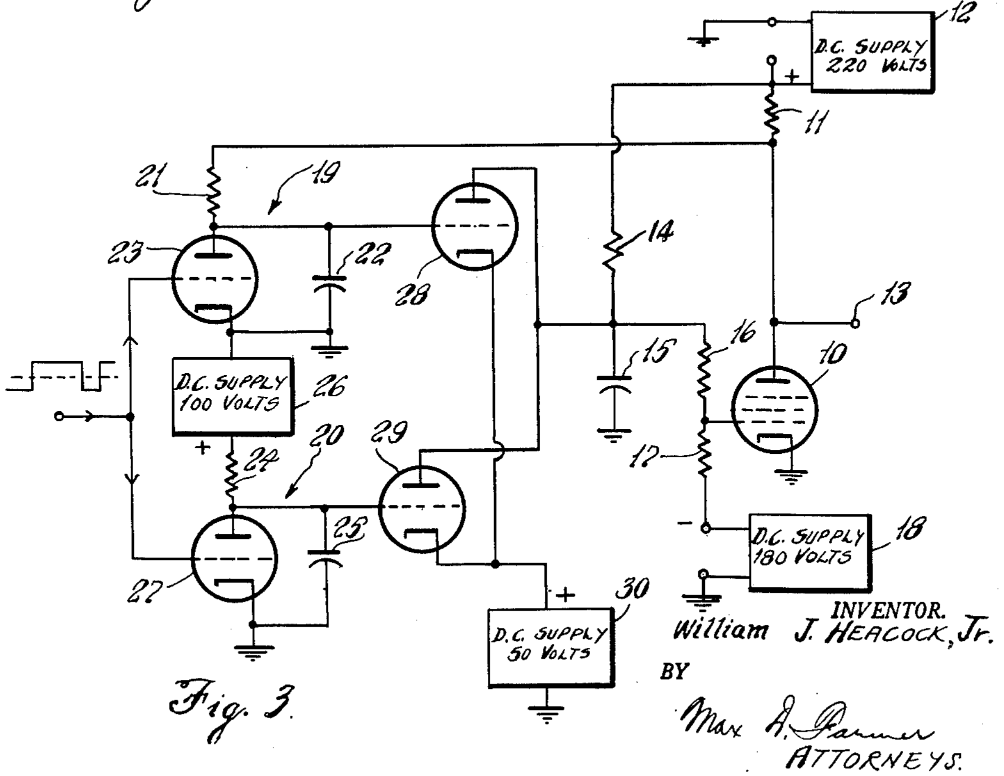
FIG. 3 is a schematic diagram of an embodiment of the storage timer gating device included in the system of FIG. 1.

The storage timer gating device shown in FIG. 3 includes a plurality of voltage-changing devices responsive to a control voltage. Vacuum tubes are shown but relays with two position armatures and various impedance changing devices may be substituted with the limitation that the selected device be fast enough for the particular operating conditions. A tube 10 having at least a plate, grid and cathode is connected in series with a plate resistor 11 across a direct current supply 12, e.g., 220 volts. A gate voltage output terminal 13 is connected to the plate of tube 10. A resistor 14 and condenser 15 are also connected in series across the direct current supply 12. A grid current limiting resistor 16 is connected between the grid of triode 10 and the junction of resistor 14 and condenser 15, and a grid bias resistor 17 is connected between the grid of triode 10 and the negative terminal of direct current supply 18, e.g., 180 volts. The resistors 14, 16 and 17 function as a voltage divider and the voltage division is such that condenser 15 can charge to more than 180 volts to enable tube 10 to conduct heavily at which time its plate voltage drops close to ground potential. The substantial drop in plate voltage is readily realized with a pentode. When condenser 15 is charged to about the voltage of direct current supply 18 or higher, the triode 10 conducts, and conversely, when the condenser voltage is substantially less than the voltage of supply 18, the tube 10 is cut off.

A channel 19 controls the charging of condenser 15 to initiate conduction through triode 10 and channel 20 controls the discharge of condenser 15 to terminate conduction through triode 10. Channel 19 includes an RC combination, namely, resistor 21 and condenser 22 connected between the plate of tube 10 and ground. The condenser 22 is shunted by a tube 23 having at least a plate, grid and cathode. Channel 20 includes another RC combination, namely, resistor 24 and condenser 25 connected between a direct current power supply 26, e.g., 100 volts, and ground. The condenser 25 is shunted by a tube 27 having at least a plate, grid and cathode. The grids of tubes 23 and 27 are connected in common to the output terminal of pulse source 7; between pulses the output terminal of pulse source 7 is at a potential sufficient to cut off the tubes 23 and 27 whereby between pulses the tubes 23 and 27 cannot discharge condensers 22 and 25, but during each pulse, the tubes 23 and 27 are turned on hard providing quick discharge paths for condensers 22 and 25 respectively. Resistor 21 is of sufficient size that if tube 10 is nonconducting and tube 23 is turned on hard by an incoming pulse, the voltage at terminal 13 does not drop significantly. Tubes 28 and 29 in channels 19 and 20 respectively, each include at least a plate, a grid, and a cathode; their plates are connected to the junction of resistor 14 and condenser 15 and their cathodes are connected to a bias voltage supply 30, e.g., 50 volts. Tube 28 does not conduct unless condenser 22 is charged to about 50 volts or higher and tube 29 does not conduct unless condenser 25 is charged to about 50 volts or higher.

Whenever condenser 15 charges to substantially its maximum value, tube 10 becomes sufficiently conductive to drop its plate voltage close to ground potential, e.g., 10 volts; when the plate of tube 10 is close to ground potential, condenser 22 cannot charge sufficiently to overcome the 50 volt bias on tube 28.

The time constant of the RC circuit including resistor 11, resistor 21 and condenser 22 is so related to the terminal voltage of supply 12 that if tube 10 is not conducting and one pulse period of pulse source 7 elapses without an output pulse, condenser 22 is charged high enough to completely overcome the bias of tube 28 and provide a low impedance discharge path to +50 volts for condenser 15. The time constant of the RC circuit including resistor 24 and condenser 25 is so related to the terminal voltage of supply 26 that whenever three consecutive pulse periods of pulse source 6 elapse without an output pulse, condenser 25 charges sufficiently to completely overcome the bias of tube 29 and provide a low impedance discharge path to +50 volts for condenser 15. The time constant of the RC circuit including resistor 14 and condenser 15 is so related to the terminal voltage of supply 12 that if three consecutive pulse periods of pulse source 7 elapse during which neither tube 28 nor tube 29 is conductive, condenser 15 charges sufficiently to render tube 10 highly conductive.

The several direct current supplies 12, 18 and 30 are shown as distinct for convenience. The voltages may be obtained from one source having suitable voltage dividing elements.

When the storage timer voltage output is at the higher one of its two substantially stable levels, it is switched to its lower voltage output level upon the absence of pulses during three consecutive pulse periods of pulse source 7; when it is at the lower one of its two substantially stable levels, it is switched to its higher voltage output level upon the occurrence of a pulse during each of three consecutive pulse periods of pulse source 12. By adjusting the time constants of the RC circuits a different selected number of consecutive present and absent pulses than specified above will switch the storage timer gating device 6.

The sequence of operation of the circuit in FIG. 3 is as follows: Assuming there has not been any pulses to the grids of tubes 23 and 27 for a long time, tubes 23 and 27 are held cut off, and their plate voltages tend to be high. However, tubes 28 and 29 draw grid currents clamping the plates of tubes 23 and 27 to +50 volts. With grid current flowing in tubes 28 and 29, plate current is flowing through both and their common plate voltage is clamped very close to their common cathode voltage; with the voltage of condenser 15 equal to the cathode voltage of tubes 28 and 29, the voltage on the grid of tube 10 is sufficiently below ground to hold tube 10 cut off and the plate voltage of tube 10 is providing its unstable output voltage of 220 volts. When a pulse arrives at the grids of tubes 23 and 27, the latter are turned on hard and condensers 22 and 25 are rapidly discharged and held clamped very close to ground for the duration of the incoming pulse. As soon as the condensers 22 and 25 are discharged, tubes 28 and 29 are cut off by the +50 volt bias on their cathodes. Condenser 15 then starts to charge toward +220 volts. Tube 10 continues to be cut off and provides its unstable output voltage. At the end of the first incoming pulse, tubes 23 and 27 are cut off and the condensers 22 and 25 start charging. However, the interval between pulses is not long enough to permit either condenser 22 or condenser 25 to charge up sufficiently between the end of one pulse of the start of the succeeding pulse to raise the grids of tubes 28 and 29 above cutoff. At the start of the succeeding pulse condensers 22 and 25 are discharged again and clamped near ground. Hence, while pulses are received consecutively, the plate voltages of tubes 23 and 27 do not rise up enough to raise the grids of tubes 28 and 29 above cutoff. Condenser 15 continues to charge and some time after the beginning of the third consecutive pulse, it is charged sufficiently for the tube 10 to conduct and the storage time gating device is switched from its unstable higher voltage output to its stable lower voltage output. If there should be no pulse immediately succeeding the first pulse, condenser 22 will charge up enough during the missing pulse interval to raise the grid of tube 28 above cutoff and discharge condenser 15 back to approximately the cathode voltage of tubes 28 and 29. The same thing occurs if two consecutive pulses are followed by a missing pulse. Therefore, there must be three consecutive pulses in order for the described embodiment to switch from its unstable higher voltage gating condition to its stable lower voltage gating condition. As soon as the voltage of the plate of tube 10 drops to the lower level, about 10 volts, the grid of tube 28 cannot be raised above cutoff again until tube 10 ceases conducting. This prevents channel 19 from discharging condenser 15 when the tube 10 is conducting. When the time interval between a pulse and a succeeding pulse approaches three pulse periods at the pulse repetition frequency of the input pulse train, the tube 10 is again cut off as follows. Condenser 25 is charged sufficiently sometime after the third missing pulse would have started and overcomes the cutoff bias of tube 29 whereby the latter discharges condenser 15 back to the cathode voltage of tubes 28 and 29, cutting off tube 10 and restoring the unstable higher voltage level at the plate of tube 10.

Because the plate voltage of tube 23 varies between narrow limits, namely between 50 volts and a voltage somewhere above ground, the latter depending upon the amplitude of the pulses from source 7, and because of the size of resistor 21, charge and discharge of condenser 22 is reflected only to a negligible extent at output terminal 13.

Obviously many modifications and variations of the present invention are possible in the light of the above teachings. It is therefore to be understood that within the scope of the appended claims the invention may be practiced otherwise than as specifically described.

I claim:

1. A gating device for operation by a pulse train comprising: electrical means for providing either one of two output voltages and characterized by stability when providing one of the two output voltages, actuatable to provide its other output voltage, instability when providing the other output voltage and automatic reversion to its stable output voltage a predetermined interval following the last actuation; a first pulse circuit means connected to said electrical means and operable only in response to the coincidence of the unstable one of the output voltages and a gap between pulses of said pulse train exceeding a predetermined fraction of said predetermined interval, to actuate said electrical means to renew said predetermined interval of unstable output voltage, a second pulse circuit means connected to said electrical means and operable in response to each occurrence of a gap between pulses of said pulse train exceeding a predetermined larger fraction of said predetermined interval to actuate said electrical means, whereby when said electrical means is providing its stable operating voltage it is actuatable only by said second pulse circuit upon the occurrence of a gap between pulses of said pulse train exceeding said predetermined larger fraction of said predetermined interval, and when said electrical means is providing its unstable output voltage it is actuatable by said first pulse circuit upon the occurrence of a gap between pulses of said pulse train exceeding said predetermined fraction of said predetermined interval, or if not actuated during said predetermined interval following the last actuation said electrical means reverts automatically to its stable output voltage.

2. A gating device as defined in claim 1 further comprising a source of identical pulses of predetermined pulse repetition frequency wherein at intervals, there is a gap between successive pulse periods equal to an integral multiple of the pulse period, said pulse source being coupled to said pulse circuits.

3. A storage timer gating device comprising a terminal for connection to a source of relatively high voltage, another terminal for connection to a circuit to be gated, a conductor connecting said terminals and having therein an impedance, means coupled to said conductor and operable to either block current flow or to establish a predetermined level of current flow through said conductor between said terminals, a pair of pulse circuits connected in parallel between a source of reference pulse inputs and said voltage controlling means, one of said parallel circuits being responsive to a selected repetition pattern of pulses from said pulse input source and operable on said means to cause the latter to establish, in said conductor a predetermined stable change in current, the other of said parallel circuits being responsive to a selected variation in said pulse pattern from said pulse source and also operable on said means to cancel said predetermined stable change in current.

4. A storage timer gating device comprising a terminal for connection to a source of relatively high positive voltage, another terminal for connection to a circuit to be gated, a conductor connecting said terminals and having in series therein a resistance, an electron discharge device having a plate, a cathode and a grid, with said plate connected to said conductor in the part thereof between said resistance and said another terminal, with said cathode connected to a source of reference voltage, a source of reference pulse inputs, a circuit connected between said source of pulse inputs and said grid and having as one part thereof nearest said source of pulse inputs a pair of parallel branch circuits, and in the other part thereof a control resistance connected in series with said branch circuits, and a condenser connected at one side to the junction between said control resistance and said branch circuits and at its other side to said source of reference voltage, a connection from the end of said control resistance remote from said junction to a source of positive voltage, a resistor connected between said grid and said junction, a connection between said grid and a source of negative voltage and having a resistor in series therein, one of said branch circuits being responsive to a selected repetition pattern of pulses from said pulse source and operable through said grid to control the voltage delivered to said another terminal and produce a predetermined change in voltage at said another terminal, the other of said branch circuits being responsive to a selected variation in said pulse pattern from said pulse source and operable through said grid to cancel said predetermined change in voltage at said another terminal.

5. A storage timer gating device as defined in claim 6, wherein said source of reference pulse inputs generates a train of substantially identical pulses of predetermined pulse repetition frequency but wherein at intervals along said train of pulses, one pulse or a plurality of would-be successive pulses are absent from said train of pulses, means connected between said another terminal and said one branch circuit to render said one branch circuit ineffective when said changed voltage condition prevails at said another terminal and wherein when said unchanged voltage prevails at said another terminal, said one of said branch circuits is responsive to a predetermined number of consecutive pulses wherein no pulses are absent, and wherein when said changed voltage prevails at said another terminal the other of said branch circuits is responsive to the absence from the train of pulses of a predetermined number of would-be consecutive pulses.

6. A storage timer gating device operable by a source of pulses, comprising an electron discharge device having a plate, a cathode and a grid, with said cathode connected to a source of reference voltage, a terminal connected to a source of relatively high positive voltage, another terminal connected to the plate of said electron discharge device and for coupling to a circuit to be gated, a conductor connecting said terminals and having in series therein a resistance, a condenser connected at one end to said source of reference potential, a resistor connected between the other end of said condenser and said source of high positive voltage for conducting charging current to said condenser, a grid current limiting resistor connected between said grid and the junction of said condenser and said resistor for conducting condenser charging current and substantially larger than the latter, a grid bias resistor connected between said grid a source of negative potential such that said electron discharge device is cut off when said condenser is relatively uncharged and is rendered substantially conductive when said condenser is charged, a pair of electron discharge devices each having a plate, a cathode and a grid, the plates of said pair of electron discharge devices being connected to the junction of said condenser and resistor for conducting condenser charging current, the cathodes of said pair of electron discharge devices being connected to a source of relatively low positive potential, whereby when either of said pair of electron discharge devices is rendered very conductive, the plates thereof and said condenser are substantially clamped to said relatively low positive potential under which condition said first-mentioned electron discharge device is cut off, another condenser connected at one end to said source of reference potential and at its other end to the grid of one of said pair of said electron discharge devices, a resistor connected between said other end of said another condenser and the plate of said first-mentioned electron discharge device, still another condenser connected between said source of reference potential and the grid of the other of said pair of said electron discharge devices, a resistor connected between said other end of said still another condenser and still another source of relatively high positive voltage, means for selectively shunting with low impedance said another condenser and said still another condenser whenever it receives a predetermined positive pulse and for the duration of the pulse, said another condenser being of such size relative to the resistors in series therewith that when not shunted and said first-mentioned electron discharge device is not conducting said another will charge in a predetermined interval to a level sufficient to cause the one of said pair of electron discharge devices to which it is connected to conduct and thereby discharge said first-mentioned condenser, said still another condenser being of such size relative to its charging resistor that when not shunted it will charge in a substantially longer predetermined interval to a level sufficient to cause the one of said pair of electron discharge devices to which it is connected to conduct and thereby discharge said first-mentioned condenser, whereby if a selected number of said positive pulses arrive in train, said pair of electron discharge devices remain cut off for that interval and said first-mentioned condenser is charged and the voltage at the plate of said first electron discharge device drops to a low level, and while this condition prevails said another condenser cannot be charged enough to cause discharge of said first-mentioned condenser, and whereby if subsequently there is absence of another selected number of pulses said still another condenser is charged enough to cause cutoff of said first-mentioned electron discharge device and the voltage at its plate rises back to the level before said voltage drop.

References Cited in the file of this patent

UNITED STATES PATENTS

2,847,565 Clapper ---------------- Aug. 12, 1958